United States Patent
Tanaka et al.

(10) Patent No.: US 9,033,570 B2
(45) Date of Patent: May 19, 2015

(54) MIXING ROTOR AND INTERNAL MIXER

(71) Applicant: Kobe Steel, Ltd., Kobe-shi (JP)

(72) Inventors: Yusuke Tanaka, Takasago (JP);
Norifumi Yamada, Takasago (JP);
Yasuaki Yamane, Takasago (JP);
Masaaki Uemura, Takasago (JP);
Kazuhisa Fukutani, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/373,492

(22) PCT Filed: Jan. 22, 2013

(86) PCT No.: PCT/JP2013/000271
§ 371 (c)(1),
(2) Date: Jul. 21, 2014

(87) PCT Pub. No.: WO2013/114810
PCT Pub. Date: Aug. 8, 2013

(65) Prior Publication Data
US 2014/0369843 A1 Dec. 18, 2014

(30) Foreign Application Priority Data
Jan. 31, 2012 (JP) ................................. 2012-018556

(51) Int. Cl.
B29B 7/18 (2006.01)
F01D 5/12 (2006.01)
(Continued)

(52) U.S. Cl.
CPC ... F01D 5/12 (2013.01); B29B 7/82 (2013.01); B29C 47/40 (2013.01);
(Continued)

(58) Field of Classification Search
CPC .............................. B29B 7/186; B29B 7/246
USPC ............... 366/142, 189, 192, 194–196, 76.1, 366/76.2, 76.93, 76.7, 76.8, 77, 96, 97; 425/204, 208, 209
See application file for complete search history.

(56) References Cited

U.S. PATENT DOCUMENTS 4,058,297 A * 11/1977 Seufert ............................ 366/81
4,084,263 A * 4/1978 Millauer .......................... 366/84
(Continued)

FOREIGN PATENT DOCUMENTS

JP 58 4567 1/1983
JP 8 229938 9/1996
(Continued)

OTHER PUBLICATIONS

International Search Report and Written Opinion of the International Searching Authority Issued Feb. 19, 2013 in PCT/JP13/000271 Filed Jan. 22, 2013.

*Primary Examiner* — Charles Cooley
(74) *Attorney, Agent, or Firm* — Oblon, McClelland, Maier & Neustadt, L.L.P.

(57) ABSTRACT

A mixing rotor includes: a rotor shaft portion that includes a cooling passageway formed therein, and a mixing blade portion that is formed in an outer circumferential portion of the rotor shaft portion, wherein each of the long blades of the mixing blade portion includes a land portion as an end surface of the long blade facing a radially outside of the mixing rotor, a length of each of the long blades in the axis direction is set to be 0.6 times or more as large as a length of the mixing blade portion in the axis direction, a biting angle of each of the long blades is set to an angle equal to or smaller than 31°, and a center angle with respect to a land width as a width of the land portion in the cross-section of each of the long blades orthogonal to the axis direction is set to an angle equal to or larger than 7°.

10 Claims, 6 Drawing Sheets

(51) Int. Cl.
    *B29B 7/82*         (2006.01)
    *B29C 47/40*       (2006.01)
    *B29C 47/60*       (2006.01)
    *B29C 47/64*       (2006.01)
    *B29B 7/24*         (2006.01)
    *B29C 47/62*       (2006.01)

(52) U.S. Cl.
    CPC ............ *B29C 47/6075* (2013.01); *B29C 47/64* (2013.01); *B29B 7/186* (2013.01); *B29B 7/246* (2013.01); *B29C 47/6056* (2013.01); *B29C 47/62* (2013.01)

(56) References Cited

U.S. PATENT DOCUMENTS

| | | | | |
|---|---|---|---|---|
| 4,234,259 | A * | 11/1980 | Wiedmann et al. | 366/81 |
| 4,284,358 | A * | 8/1981 | Sato et al. | 366/97 |
| 4,300,838 | A * | 11/1981 | Sato et al. | 366/84 |
| 4,456,381 | A * | 6/1984 | Inoue et al. | 366/97 |
| 4,714,350 | A * | 12/1987 | Nortey | 366/84 |
| 4,718,771 | A * | 1/1988 | Asai et al. | 366/97 |
| 4,744,668 | A * | 5/1988 | Nortey | 366/76.7 |
| 4,834,543 | A * | 5/1989 | Nortey | 366/97 |
| 4,893,936 | A * | 1/1990 | Borzenski et al. | 366/76.7 |
| 5,044,760 | A * | 9/1991 | Asai | 366/97 |
| 5,297,935 | A * | 3/1994 | Passoni | 416/183 |
| 5,520,455 | A * | 5/1996 | Yamada et al. | 366/97 |
| 5,672,006 | A * | 9/1997 | Hanada et al. | 366/84 |
| 5,791,776 | A * | 8/1998 | Takakura et al. | 366/84 |
| 5,984,516 | A * | 11/1999 | Inoue et al. | 366/97 |
| 6,402,360 | B1 * | 6/2002 | Nortey | 366/85 |
| 6,494,607 | B2 * | 12/2002 | Valsamis et al. | 366/84 |
| 6,811,295 | B2 * | 11/2004 | Koro et al. | 366/97 |
| 6,913,379 | B2 * | 7/2005 | Otsuka et al. | 366/76.7 |
| 7,556,420 | B2 * | 7/2009 | Limper et al. | 366/84 |
| 7,677,789 | B2 * | 3/2010 | Huffstetler et al. | 366/97 |
| 7,854,542 | B2 * | 12/2010 | Inoue et al. | 366/97 |
| 8,882,337 | B2 * | 11/2014 | Yoshida et al. | 366/97 |
| 8,926,166 | B2 * | 1/2015 | Yoshida et al. | 366/97 |
| 2001/0036123 | A1 * | 11/2001 | Koro et al. | 366/84 |
| 2001/0050880 | A1 * | 12/2001 | Regalia | 366/84 |
| 2002/0163852 | A1 * | 11/2002 | Valsamis et al. | 366/84 |
| 2006/0098527 | A1 * | 5/2006 | Limper et al. | 366/97 |
| 2006/0104154 | A1 * | 5/2006 | Inoue et al. | 366/96 |
| 2011/0222364 | A1 * | 9/2011 | Yoshida et al. | 366/98 |
| 2012/0014206 | A1 * | 1/2012 | Yoshida et al. | 366/97 |

FOREIGN PATENT DOCUMENTS

| | | | | |
|---|---|---|---|---|
| JP | 09216224 | A * | 8/1997 | ............ B29B 7/18 |
| JP | 11188249 | A * | 7/1999 | ............ B01F 7/08 |
| JP | 2000 246731 | | 9/2000 | |
| JP | 2002 11336 | | 1/2002 | |
| JP | 2006 26991 | | 2/2006 | |
| JP | 2006 142616 | | 6/2006 | |
| JP | 2010 247412 | | 11/2010 | |
| SU | 1482805 | A1 * | 5/1989 | |

\* cited by examiner

MIXING ROTOR AND INTERNAL MIXER

TECHNICAL FIELD

The present invention relates to a mixing rotor and an internal mixer used to mix a polymer material such as plastic or rubber.

BACKGROUND ART

In an internal mixer of the related art, a tangential rotor (mixing rotor) is employed when there is a need to maintain a large mixing capacity in order to improve the productivity of the internal mixer for producing a mixed material (for example, see Patent Document 1). In the internal mixer of the related art that employs the tangential rotor, it is difficult to transmit high specific energy (mixing energy per unit weight of a material to be mixed) to the material to be mixed in a short time. For this reason, a method is used which increases the mixing time in order to mix the material to be mixed as one in a desired mixed state.

However, with the method of increasing the mixing time, the temperature of the material to be mixed increases with the passage of the mixing time. On the other hand, there is a limit to temperatures such as a temperature of preventing the degradation of the material to be mixed and a predetermined reaction temperature for the material to be mixed. In these circumstances, for the internal mixer using the tangential rotor of the related art, there is often a case in which the number of rotations of the rotor needs to be decreased after the mixing time reaches certain time in order to prevent the temperature of the material to be mixed from exceeding the temperature limit. As described above, problems with the related art include the extended mixing time and the decreased number of rotations of the rotor. As a result, a problem arises that the productivity does not improve due to the influence thereof.

Accordingly, a mixing rotor is also developed which may perform a low-temperature mixing operation and improve the mixing quality, as compared to the rotor disclosed in Patent Document 1, by exercising ingenuity in the shape, the arrangement or the like of blades (for example, see Patent Document 2). However, there is a room for improvement in the productivity of the mixing rotor for producing the mixed material.

Specifically, in the tangential hermetically sealed, even when there is an attempt to transmit high specific energy to the material to be mixed in a short time by decreasing the weight of the material to be mixed input into the chamber so as to increase the amount of the mixing energy transmitted to the material to be mixed per unit weight of the material to be mixed, the mixing energy is not easily transmitted to the material to be mixed due to the influence of a decrease in the charging rate of the material to be mixed inside the chamber. For this reason, the mixing time may not be noticeably shortened, and the weight of the material to be mixed input per batch decreases. Accordingly, the productivity of the mixer of the related art for the mixed material does not improve as expected.

Further, in such a tangential internal mixer, in order to shorten the mixing time by promptly increasing the homogeneity of the material to be mixed inside the chamber, a method is also used which increases the torsion angle of each blade with respect to the rotor axial line in order to cause the active flow of the material to be mixed in the rotor axis direction. However, when the torsion angle increases, the amount of the material to be mixed flowing toward the rear surface of the blade over the top portion (also referred to as "tip portion" or "land portion") of the blade increases. For this reason, there is an effect of improving the flow of the material to be mixed in the rotor axis direction, but the effect is low. That is, the flow of the material to be mixed in the rotor axis direction does not increase noticeably. As a result, with such a method, the mixing time is not so drastically improved.

CITATION LIST

Patent Document

Patent Document 1: JP 58-4567 B
Patent Document 2: JP 2002-11336 A

SUMMARY OF THE INVENTION

An object of the present invention is to provide a mixing rotor and an internal mixer capable of improving the productivity for a mixed material as compared to the related art without degrading the mixing quality of the mixed material.

A mixing rotor according to an aspect of the present invention is a mixing rotor for use in an internal mixer, the mixing rotor including: a rotor shaft portion that includes a cooling passageway formed therein; and a mixing blade portion that is formed in an outer circumferential portion of the rotor shaft portion, wherein the mixing blade portion includes a short blade at a predetermined length in an axis direction of the rotor shaft portion, and at least two long blades at lengths larger than the length of the short blade in the axis direction, each of the long blades including a land portion as an end surface of the long blade facing a radially outside of the mixing rotor, the length of each of the long blades in the axis direction is set to be 0.6 times or more as large as a length of the mixing blade portion in the axis direction, a biting angle of each of the long blades is set to an angle equal to or smaller than 31°, and a center angle with respect to a land width as a width of the land portion in a cross-section of each of the long blades orthogonal to the axis direction is set to an angle equal to or larger than 7°.

An internal mixer according to another aspect of the present invention includes: a pair of mixing rotors according to an aspect; and a chamber that accommodates the paired mixing rotors therein while trajectories depicted by radially outermost portions of the mixing rotors do not intersect each other during rotation of the paired mixing rotors.

DESCRIPTION OF EMBODIMENTS

Figure 1:
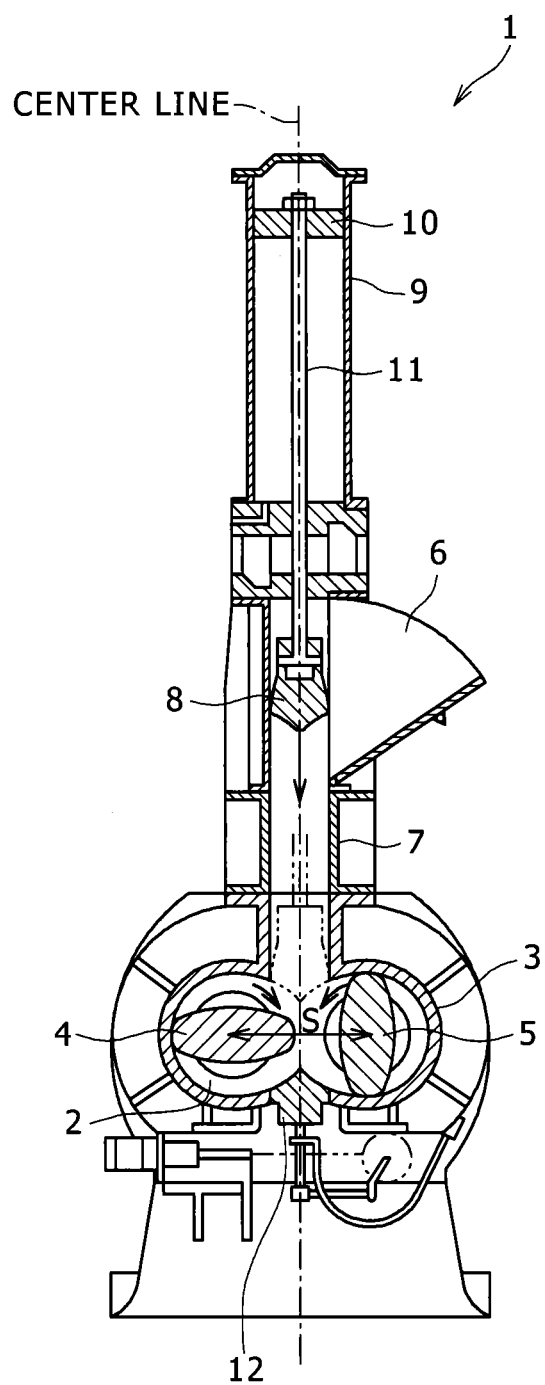
FIG. 1 is a front cross-sectional view illustrating an internal mixer equipped with a mixing rotor according to an embodiment of the present invention.

Hereinafter, embodiments of the present invention will be described by referring to the drawings.

An internal mixer according to the embodiments of the present invention illustrated in FIG. 1 is also called "batch mixer". FIG. 1 schematically illustrates a mixing rotor according to the embodiments. Furthermore, the mixing rotor and the internal mixer according to the embodiments are suitable to mix rubber having a composition causing a reaction in a mixing operation and are particularly suitable to mix rubber having a high content of silica.

(Configuration of Internal Mixer)

As illustrated in FIG. 1, an internal mixer 1 includes a chamber 3 including a mixing chamber 2 therein, a pair of left and right mixing rotors 4 and 5, a material supply cylinder 7 provided with a hopper 6, and a floating weight 8.

The mixing chamber 2 is formed so as to have an eyebrow-shaped longitudinal section. The chamber 3 includes an upper opening portion formed in an upper portion thereof. A space inside the upper opening portion communicates with the mixing chamber 2. The paired left and right mixing rotors 4 and 5 are inserted into the mixing chamber 2 so that the mixing rotors 4 and 5 are rotatable about axes thereof. The paired mixing rotors 4 and 5 are formed symmetrically. The material supply cylinder 7 is uprightly formed on the upper opening portion of the chamber 3. The floating weight 8 is accommodated inside the material supply cylinder 7 so as to be movable upward and downward.

An air pressure cylinder 9 is connected to an upper portion of the material supply cylinder 7. Alternatively, a fluid pressure cylinder that uses a pressure of a fluid other than the air may be connected to the upper portion of the material supply cylinder 7 instead of the air pressure cylinder 9. A piston 10 is accommodated inside the air pressure cylinder 9, and the piston 10 is connected to the floating weight 8 through a piston rod 11. The piston rod 11 penetrates a lower lid of the air pressure cylinder 9 so as to maintain air-tightness inside the air pressure cylinder 9. With such a configuration, when an upper space inside the air pressure cylinder 9 is pressurized so as to move the piston 10 downward, the floating weight 8 can be moved downward. Accordingly, the downward movement of the floating weight 8 enables the material to be mixed that is supplied from the hopper 6 into the material supply cylinder 7 to be pressed into the chamber 3.

Meanwhile, a bottom portion of the chamber 3 is provided with a discharge port, and this discharge port is closed by a drop door 12. A rotary actuator actuates the drop door 12 to be operable to open and close the discharge port. When the drop door 12 closing the discharge port is operated so as to open the discharge port, the mixed material (the material to be mixed completed with the mixing operation) that is mixed for a predetermined time inside the mixing chamber 2 can be discharged to an outside of the internal mixer 1.

The internal mixer 1 is a non-engagement type mixer in which the paired left and right mixing rotors 4 and 5 do not engage with each other. That is, an axial center distance S (hereinafter, "rotor axial center distance S") between the paired mixing rotors 4 and 5 of the internal mixer 1 is larger than a rotation outer diameter Dr (see FIG. 4) of each of the mixing rotors 4 and 5. In other words, rotational trajectories that are depicted by radially outermost portions of the mixing rotors 4 and 5 do not intersect each other during the rotation of the paired mixing rotors 4 and 5.

(Mixing Rotor of First Embodiment)

Figure 2:
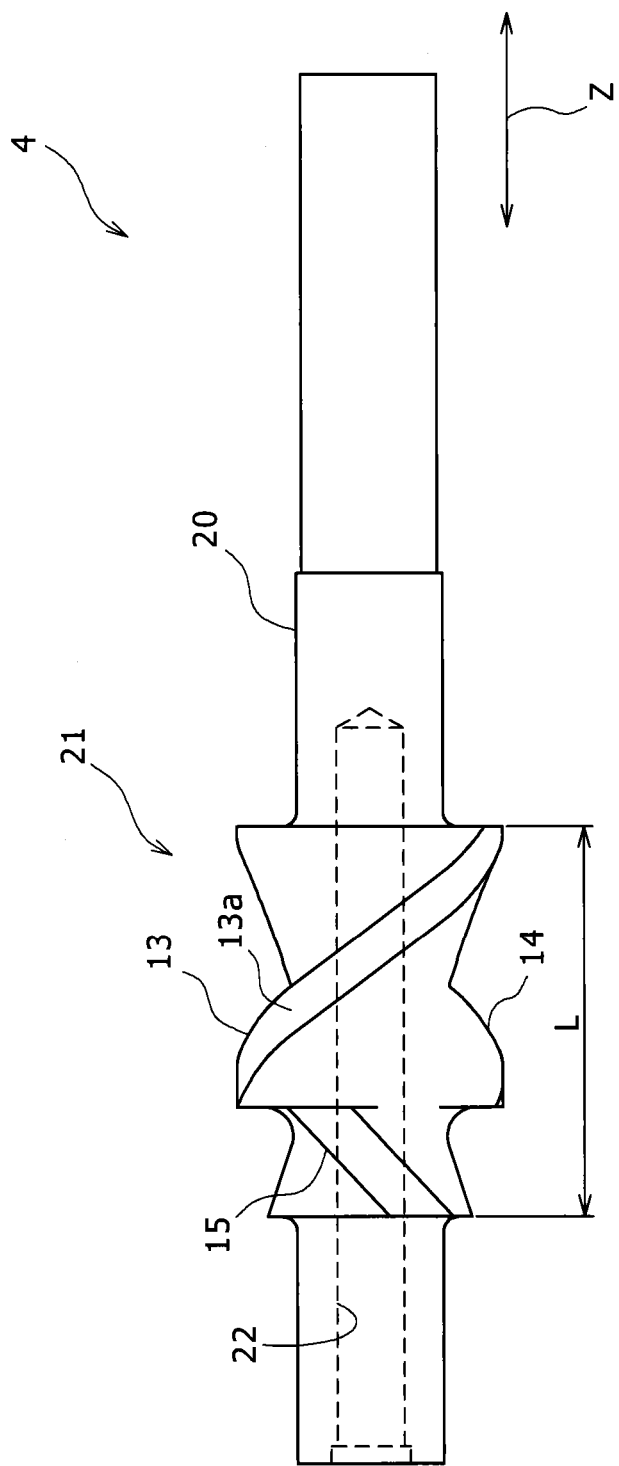
FIG. 2 is an explanatory diagram illustrating the mixing rotor according to the embodiment of the present invention.

Referring to FIGS. 1 to 4, the mixing rotors 4 and 5 according to a first embodiment of the present invention will be described. FIG. 2 is a top view for illustrating the mixing rotor 4.

Each of the mixing rotors 4 and 5 includes a rotor shaft portion 20 that includes a cooling passageway 22 formed therein and a mixing blade portion 21 that is formed in an outer circumferential portion of the rotor shaft portion 20. The mixing blade portion 21 of each of the mixing rotors 4 and 5 has a predetermined length L in an axis direction Z (hereinafter, "rotor axis direction Z") of the mixing rotor 4 or 5. Rotary joints that are used to supply a cooling medium to the cooling passageways 22 formed in the mixing rotors 4 and 5 and to discharge the cooling medium from the cooling passageway 22 are connected to the mixing rotors 4 and 5, respectively. Each of the cooling passageways 22 is a bottomed hole having a circular cross-section. The cooling passageway 22 of each of the mixing rotors 4 and 5 is provided so as to be located at a central portion of the rotor shaft portion 20 when the mixing rotor 4 or 5 is viewed from the rotor axis direction Z. Further, it is preferable that the cooling passageway 22 of each of the mixing rotors 4 and 5 is formed in at least a range from one end of the mixing blade portion 21 to the other end thereof in the rotor axis direction Z as illustrated in this embodiment in a plan view of the mixing rotor 4 or 5. For example, the water is supplied as a cooling medium to the cooling passageway 22. The water supplied to the cooling passageway 22 flows inside the cooling passageway 22 and then flows to the outside thereof. The flow of the cooling medium such as the water inside the cooling passageway 22 can prevent an increase in a temperature of the mixing blade portion 21. As a result, it is possible to prevent a state of an excessive temperature increase that causes degradation in the material to be mixed that contacts the mixing blade portion 21 from occurring.

The paired mixing rotors 4 and 5 are adapted to rotate in opposite directions so that facing portions of the mixing rotors 4 and 5 may move downward (see FIG. 1). The mixing blade portion 21 of each of the mixing rotors 4 and 5 includes a plurality of mixing blades 13 to 16. A gap (a tip clearance) is formed between each of the mixing blades 13 to 16 and an inner wall surface (an inner peripheral surface) of a portion accommodating the mixing rotor 4 or 5 provided with the mixing blades 13 to 16 in the chamber 3, and a shearing force is applied to the material to be mixed that passes through the gap during the rotation of the mixing rotors 4 and 5. Each of the mixing blades 13 to 16 has a spiral shape about the axial center of the mixing rotor 4 or 5 provided with those mixing blades 13 to 16. Due to the shapes of the mixing blades 13 to 16, the material to be mixed is pressed toward one side in the rotor axis direction Z during the rotation of the mixing rotors 4 and 5, and hence the flow of the material to be mixed is generated in the rotor axis direction Z. Further, the material to be mixed moves between the paired mixing rotors 4 and 5 arranged at a predetermined distance kept therebetween during the rotation of those mixing rotors 4 and 5. The mixing blades 13 to 16 include mixing blade top portions (also "tip portions" or "land portions") 13a to 16a, respectively that are front end surfaces of the mixing blades 13 to 16 facing radially outward of the mixing rotor 4 or 5 provided with the mixing blades 13 to 16. Specifically, the tip clearance indicates the gap between each of the mixing blade top portions 13a to 16a of the mixing blades 13 to 16 and the inner wall surface (the inner peripheral surface) of the portion accommodating the mixing rotor 4 or 5 provided with the mixing blades 13 to 16 in the chamber 3.

Note that the mixer and the mixing rotor each having a configuration in which the rotational trajectories depicted by the radially outermost portions of the mixing rotors during the rotation of the paired mixing rotors do not intersect each other, that is, the rotor axial center distance S is larger than the rotor rotation outer diameter Dr of the mixing rotor are referred to as "tangential mixer" and "tangential mixing rotor", respectively.

Figure 3:
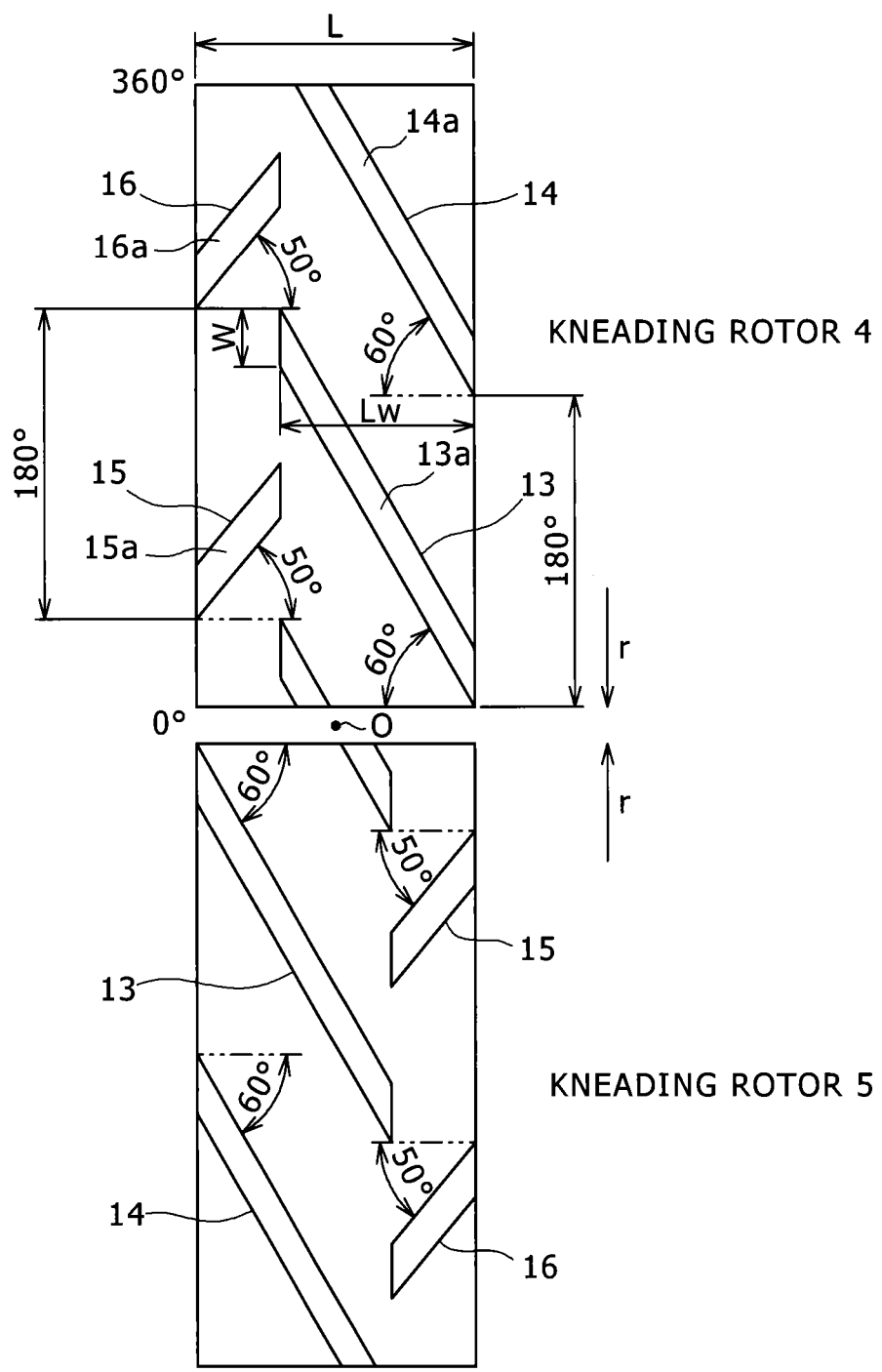
FIG. 3 is a development diagram about an axial center of a mixing blade portion of each mixing rotor illustrated in FIG. 2.

FIG. 3 illustrates a development diagram about the axial center of the mixing blade portion 21 of each of the mixing rotors 4 and 5. As illustrated in FIG. 3, the mixing blades 13 to 16 of the mixing rotors 4 and 5 of this embodiment are arranged so as to be point-symmetrical to each other with respect to a point O of FIG. 3. Accordingly, in the description below, a structure of one mixing rotor 4 representing both the mixing rotors 4 and 5 will be described.

As illustrated in FIGS. 2 and 3, the mixing blade portion 21 of the mixing rotor 4 includes the four mixing blades 13 to 16. The four mixing blades 13 to 16 include the first long blade 13, the second long blade 14, the first short blade 15, and the second short blade 16. The mixing blade portion 21 indicates the entire portion where the mixing blades 13 to 16 are formed, of the mixing rotor 4. In general, a length of the short blade in the rotor axis direction is 0.5 or less times as large as a length of the mixing blade portion in the rotor axis direction. Further, generally, a length of the long blade in the rotor axis direction is larger than the length of the short blade in the rotor axis direction, and the length in the rotor axis direction is 0.5 times ore more as large as the length of the mixing blade portion in the rotor axis direction.

(First Long Blade)

In this embodiment, the first long blade 13 is formed in an area from one end of the mixing blade portion 21 in the rotor axis direction Z to an intermediate portion of the mixing blade portion 21 in the rotor axis direction Z. Further, the first long blade 13 is formed into a shape in which a development shape of the first long blade 13 is a linear shape when the mixing blade portion 21 is developed in a plane state about the axial center thereof. In this embodiment, the first long blade 13 is formed into a spiral shape at a torsion angle of 60° with respect to the rotor axial line of the mixing rotor 4 (axial line of the rotor shaft portion 20) so that the material to be mixed flows toward a center of the mixing blade portion 21 in the rotor axis direction Z by the first long blade 13 during the rotation of the mixing rotor 4. That is, the first long blade 13 has the torsion angle of 60° with respect to the rotor axis direction Z of the mixing rotor 4 provided with the first long blade 13. Note that the torsion angle of the blade indicates the angle formed between the blade and the rotor axial line in the development shape obtained when the mixing blade portion is developed in a plane state about the axial center. When the torsion angle of the first long blade 13 is smaller than 40°, the flow of the material to be mixed in the rotor axis direction Z becomes slow, and hence the mixing time necessary for improving the homogeneity of the mixed material increases. For this reason, it is preferable that the torsion angle of the first long blade with respect to the rotor axis direction Z is set to an angle of 40° or more. The same applies to the other blades to be described later.

It is more preferable that the torsion angle of the first long blade with respect to the rotor axis direction Z is equal to or larger than 50° and equal to or smaller than 65°. The same applies to the other blades to be described later. If the torsion angle of the blade is equal to or larger than 50°, it is possible to reduce a leakage amount of the material to be mixed (to be described later in detail) caused by the setting of a land center angle to, for example, an angle equal to or larger than 7° and to further activate the flow of the material to be mixed in the rotor axis direction Z. As a result, the homogeneity of the material to be mixed inside the chamber 3 can be improved in shorter time. However, if the torsion angle of the blade exceeds 65°, another problem easily arises that the material to be mixed may not be easily inserted into the chamber 3 (the mixing chamber 2) in an initial mixing period. For this reason, it is preferable that the torsion angle of the blade is equal to or smaller than 65°.

As described above, the length of the long blade in the rotor axis direction is generally set to be 0.5 times or more as large as the length of the mixing blade portion in the rotor axis direction. However, in order to activate the flow of the material to be mixed in the rotor axis direction Z, it is preferable that the length Lw of the first long blade 13 in the rotor axis direction Z is set to be 0.6 times or more as large as the length L of the mixing blade portion 21 in the rotor axis direction Z. The same applies to the second long blade to be described below. In this embodiment, the length Lw of the first long blade 13 in the rotor axis direction Z is set to 0.7 times as large as the length L of the mixing blade portion 21 in the rotor axis direction Z. If the length of the long blade Lw in the rotor axis direction Z is set to 0.6 times or more as large as the length L of the mixing blade portion 21 in the same direction, it is possible to improve a charging rate of the material to be mixed inside the chamber 3 (the mixing chamber 2). As a result, it is possible to obtain an effect that high specific energy can be easily transmitted to the material to be mixed in a short time.

<Biting Angle>

Figure 4:
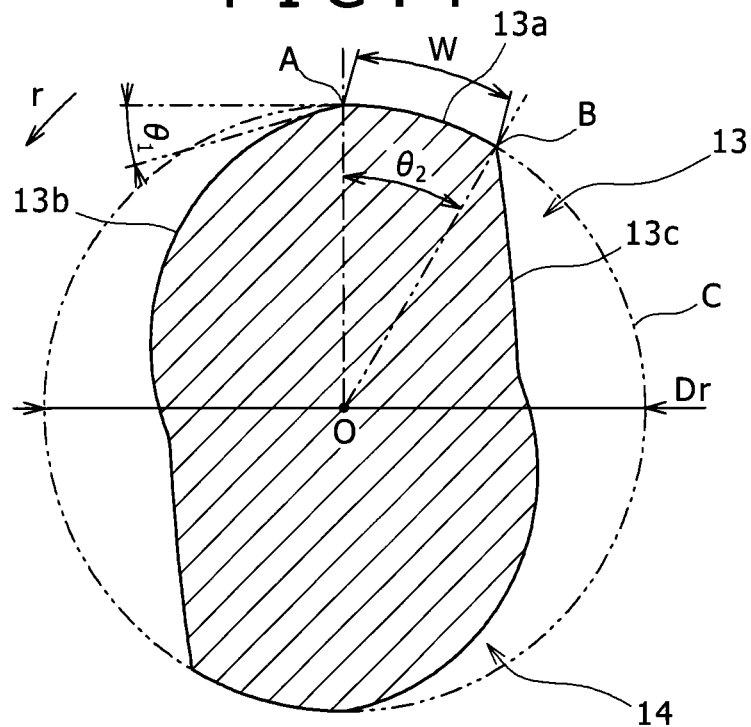
FIG. 4 is a cross-sectional view illustrating a cross-section orthogonal to the axis direction of the mixing rotor of a portion provided with long blades in the mixing blade portion of the mixing rotor illustrated in FIG. 2.

FIG. 4 illustrates a cross-section orthogonal to the rotor axis direction Z of the portion provided with the long blades 13 and 14 in the mixing blade portion 21 of the mixing rotor 4. A biting angle $\theta_1$ of the first long blade 13 illustrated in FIG. 4 is set to 15°. If a trajectory depicted by the land portion 13a (the mixing blade top portion) of the first long blade 13 during the rotation of the mixing rotor 4 is denoted by a circle C, and a point of a boundary portion between the land portion 13a of the first long blade 13 and an action surface 13b of the first long blade 13 on the circle C is denoted by a point A, then an angle formed between a tangential line of the circle C at the point A and a tangential line of the action surface 13b at the point A corresponds to the "biting angle $\theta_1$". Note that the action surface 13b is a surface that faces a front side of the first long blade 13 in a rotation direction r of the mixing rotor 4.

The biting angle $\theta_1$ of the first long blade 13 is preferably set to an angle equal to or smaller than 31°, more preferably an angle equal to or larger than 10° and equal to or smaller than 21°. The same applies to the other blades to be described later. If the biting angle $\theta_1$ of the long blade is larger than 31°, a surface area of the action surface 13b decreases. As a result, the temperature of the material to be mixed may easily increase excessively. On the contrary, if the number of rotations of the rotor is decreased in order to prevent an excessive increase in the temperature of the material to be mixed, the mixing time of the material to be mixed increases, and hence the productivity for producing the mixed material degrades. Accordingly, it is preferable that the biting angle $\theta_1$ of the long blade is equal to or smaller than 31°. However, if the biting angle $\theta_1$ of the long blade is smaller than 10°, the flow of the material to be mixed in the rotor axis direction Z may easily become slow. As a result, the mixing time necessary for improving the homogeneity of the mixed material possibly increases. For this reason, it is preferable that the biting angle $\theta_1$ of the long blade is set to the angle equal to or larger than 10°.

Furthermore, in a case where the biting angle $\theta_1$ is equal to or smaller than 21°, a cooling performance of the material to be mixed can be further improved even if the land center angle $\theta_2$ (to be described later in detail) is set to any angle in a range equal from 7° to 40° (see FIG. 8). If the cooling performance of the material to be mixed is improved, the number of rotations of the rotor can be increased, and hence the productivity for producing the mixed material can be further improved. Note that an upper limit of the biting angle $\theta_1$ is about 54° from the viewpoint of the structure of the mixing rotor.

<Center Angle with Respect to Land Width>

It is preferable that the center angle $\theta_2$ with respect to a land width W of the long blade is set to an angle equal to or larger than 7°. The same applies to the other blades to be described later. In this embodiment, the center angle with respect to the land width W of the first long blade 13 is 30°. Note that the land width W is a width of the land portion 13a in a cross-section of the land portion 13a orthogonal to the rotor axis direction Z of the land portion 13a, and indicates a length along the circular-arc of a circular-arc portion of the land portion 13a parallel to the inner wall surface of the chamber 3. The land width W is illustrated in FIGS. 3 and 4. Furthermore, the center angle $\theta_2$ (hereinafter, "land center angle $\theta_2$") with respect to the land width W indicates an angle formed between a line connecting one end (the point A) of the land portion 13a in the cross-section orthogonal to the rotor axis direction Z to the center O of the circle C (rotation center (axial center) of the mixing rotor 4) and a line connecting the other end (a point B) of the land portion 13a in the same cross-section to the center O of the circle C (rotation center (axial center) of the mixing rotor 4). Note that the point B corresponds to a point of a boundary between the land portion 13a and a blade rear surface 13c of the first long blade 13. The blade rear surface 13c is a surface opposite to the action surface 13b of the first long blade 13, that is, the surface of the first long blade 13 facing a rear side in the rotation direction r of the mixing rotor 4.

Since the land center angle $\theta_2$ of the first long blade 13 (long blade) is equal to or larger than 7°, an amount of the material to be mixed that passes through the tip clearance, that is, the amount (the leakage amount) of the material to be mixed that flows to the blade rear surface 13c of the first long blade over the land portion 13a can be decreased as compared to an ordinary long blade of the tangential rotor of the related art that mixes the material to be mixed by causing the material to be mixed to actively pass through the tip clearance, to be specific, the long blade having a land center angle of about 2° to 3°. However, this applies to a case where the tip clearance between the long blades as the comparison targets is the same. As described about, since the amount of the material to be mixed that passes through the tip clearance decreases, the flow of the material to be mixed in the rotor axis direction Z is activated, and the heating amount of the material to be mixed caused by the passage of the material to be mixed through the tip clearance can be suppressed. Further, a mixing capacity inside the chamber 3 (inside the mixing chamber 2) decreases as compared to the related art. Accordingly, the charging rate of the material to be mixed inside the chamber 3 (inside the mixing chamber 2) increases, and hence the high specific energy can be easily transmitted to the material to be mixed in a short time.

Note that, if the land center angle $\theta_2$ is larger than 40°, then the further improvement in the effect of reducing the leakage amount of the material to be mixed may not be expected, and the mixing capacity inside the chamber 3 relatively decreases. For this reason, it is preferable that the land center angle $\theta_2$ is equal to or smaller than 40°. The same applies to the other blades to be described later.

Further, a size of the tip clearance as the gap between the land portion 13a of the first long blade 13 (long blade) and the portion facing the land portion 13a in the inner wall surface of the chamber 3 is set to have a ratio equal to or higher than 0.005 and equal to or lower than 0.05 to an inner diameter of the portion accommodating the mixing rotor 4 provided with the first long blade 13 in the chamber 3. The same applies to the other blades to be described later. Note that the ratio is referred to as "tip clearance ratio". Since the tip clearance ratio is set to be equal to or higher than 0.005 and equal to or lower than 0.05, the leakage amount of the material to be mixed may be reduced, and hence the flow of the material to be mixed in the rotor axis direction Z is activated.

Further, in a case of at least the long blades 13 and 14 among those of the mixing rotor, a height of the land portion (blade top portion) is set to be uniform from one end of the blade to the other end thereof so that the size of the tip clearance becomes uniform from one end of the blade to the other end thereof in the rotor axis direction. The height of the land portion is a distance from the axial center of the mixing rotor to the land portion, and corresponds to, for example, a linear distance between the center O and the point A in FIG. 4. If the tip clearance ratio falls within a range of 0.005 to 0.05, the height of the land portion (blade top portion) may be changed between one end of the blade to the other end thereof. In this case, portions other than the highest portion of the land portion may be formed to have a flat surface instead of the circular-arc surface.

(Second Long Blade)

In this embodiment, a development shape, a land width, a torsion angle, a length, a biting angle, and a land center angle of the second long blade 14 are the same as those of the first long blade 13, respectively. Only the arrangement of the second long blade 14 is different from the arrangement of the first long blade 13. Specifically, the second long blade 14 is arranged in rear of the first long blade 13 in the rotor rotation direction r. More specifically, the second long blade 14 is arranged in rear of the first long blade 13 in the rotor rotation direction r so as to have a phase difference of 180° from the first long blade 13 in respect of a rotation phase of the mixing rotor.

Furthermore, if the mixing rotor is provided with only one long blade, then the mixing capacity inside the chamber 3 increases, and hence high specific energy may not be transmitted to the material to be mixed in a short time. For this reason, the mixing rotor needs to include at least two long blades.

(First Short Blade)

In this embodiment, the first short blade 15 is formed in an area from the other end (opposite to the end on which the first long blade 13 is formed) of the mixing blade portion 21 in the rotor axis direction Z to an intermediate portion of the mixing blade portion 21 in the rotor axis direction Z. Further, the first short blade 15 is formed into a shape in which a development shape of the first short blade 15 is a linear shape when the mixing blade portion 21 is developed in a plane shape about the axial center thereof. Specifically, the first short blade 15 is formed into a spiral shape at a torsion angle of 50° with respect to the rotor axial line (the rotor axis direction Z) so that the material to be mixed flows toward the center of the first short blade 15 in the rotor axis direction Z by the first short blade 15 during the rotation of the mixing rotor 4. That is, the first short blade 15 has a spiral shape with a torsion in a direction opposite to that of the long blade.

It is preferable that the length of the first short blade 15 in the rotor axis direction Z is smaller than the lengths of the long blades 13 and 14 in the same direction. For example, it is preferable that the length of the first short blade 15 in the rotor axis direction Z is 0.4 times or less as large as the length L of the mixing blade portion 21 in the same direction. In this embodiment, the length of the first short blade 15 in the rotor axis direction Z is 0.3 times as large as the length L of the mixing blade portion 21 in the rotor axis direction Z. Furthermore, it is preferable that each of the sum of the length of the first long blade 13 in the rotor axis direction Z and the length of the first short blade 15 in the rotor axis direction Z and the sum of the length of the second long blade 14 in the rotor axis direction Z and the length of the second short blade 16 in the rotor axis direction Z is equal to the length L of the mixing blade portion 21 in the rotor axis direction Z.

Further, a start point of the first short blade 15, that is, a front edge of the first short blade 15 in the rotor rotation direction r is located is rear of a start point of the first long blade 13, that is, a front edge of the first long blade 13 in the rotor rotation direction r. Furthermore, a land width, a biting angle, and a land center angle of the first short blade 15 of this embodiment are the same as those of the first long blade 13, respectively.

(Second Short Blade)

In this embodiment, a development shape, a land width, a torsion angle, a length, a biting angle, and a land center angle of the second short blade 16 are the same as those of the first short blade 15, respectively. Only the arrangement of the second short blade 16 is different from the arrangement of the first short blade 15. Specifically, the second short blade 16 is arranged in rear of the first short blade 15 in the rotor rotation direction r. More specifically, the second short blade 16 is arranged in rear of the first short blade 15 in the rotor rotation direction r so as to have a phase difference of 180° from the first short blade 15 in respect of the rotation phase of the mixing rotor.

(Operation (Material Mixing Method) of Internal Mixer)

Referring to FIG. 1, an operation performed by the internal mixer 1 will be described. First, the floating weight 8 is separated from the chamber 3 so as to open the upper opening portion of the chamber 3 while the drop door 12 is brought into close contact with the chamber 3. Thereafter, the material to be mixed is charged into the chamber 3 (into the mixing chamber 2) through this upper opening portion and the space inside the material supply cylinder 7, and then the floating weight 8 is brought into close contact with the chamber 3 so that the material to be mixed is pressed into the chamber 3 (into the mixing chamber 2).

Next, the mixing rotors 4 and 5 start rotating in the opposite directions, so that the mixing rotors 4 and 5 mix the material to be mixed. When the material to be mixed is mixed into a desired mixed state, the drop door 12 is separated from the chamber 3 so that the mixed material (completely mixed material) inside the mixing chamber 2 is discharged from the discharge port in the bottom portion of the chamber 3 to the outside of the mixer.

In the tangential internal mixer of the related art, attention is paid to actively applying a shearing force to the material to be mixed and mixing (dispersively mixing) the material to be mixed by passing the material to be mixed through the tip clearance. However, this causes problems. The present invention results from the present inventor's paying attention to the problems and conducting repeated examinations for the problems. Specifically, the present inventor has found the following knowledge. It is possible to transmit high specific energy to the material to be mixed in a short time even if the shearing force equal to the shearing force of the related art is not applied to the material to be mixed so as to actively mix the material to be mixed as long as the mixing capacity inside the chamber is limited to a capacity smaller than that of the related art and the passage amount (leakage amount) by which the material to be mixed passes through the tip clearance is reduced. As a result, the dispersibility of the material to be mixed does not degrade. The present inventor has then found the following knowledge. The dispersion-mixing of the material to be mixed is promoted to improve uniformity in the mixing of the material to be mixed, and the material to be mixed can be eventually completely mixed in a short time as long as the mixing capacity inside the chamber is limited to the capacity smaller than that of the related art and the passage amount (the leakage amount) by which the material to be mixed passes through the tip clearance is reduced. The present inventor has reached the following conclusion on the basis of these knowledges. It is possible to prevent the degradation of the material to be mixed due to the excessive increase in the temperature thereof, and compensate the degradation of the productivity for producing the mixed material per batch by shortening the mixing time as long as the mixing capacity inside the chamber is limited to the capacity smaller than that of the related art and the passage amount by which the material to be mixed passes through the tip clearance is reduced. The present inventor has achieved the present invention on the basis of this conclusion. That is, according to the mixing rotor of the present invention and the internal mixer including the mixing rotor, the productivity for producing the mixed material can be improved without degrading the mixing quality of the mixed material.

(Mixing Rotor of Second Embodiment)

Next, a mixing rotor according to a second embodiment of the present invention will be described. The mixing rotor according to the second embodiment differs from the mixing rotor according to the first embodiment in a magnitude of the land center angle (land width W). The mixing rotor according to the second embodiment is configured similarly to that according to the first embodiment in the other configurations. The land center angles of the blades of the mixing rotor according to the second embodiment are all set to 15°.

(Calculation Result of Leakage Amount of Material to be Mixed to Blade Rear Surface)

Figure 5:
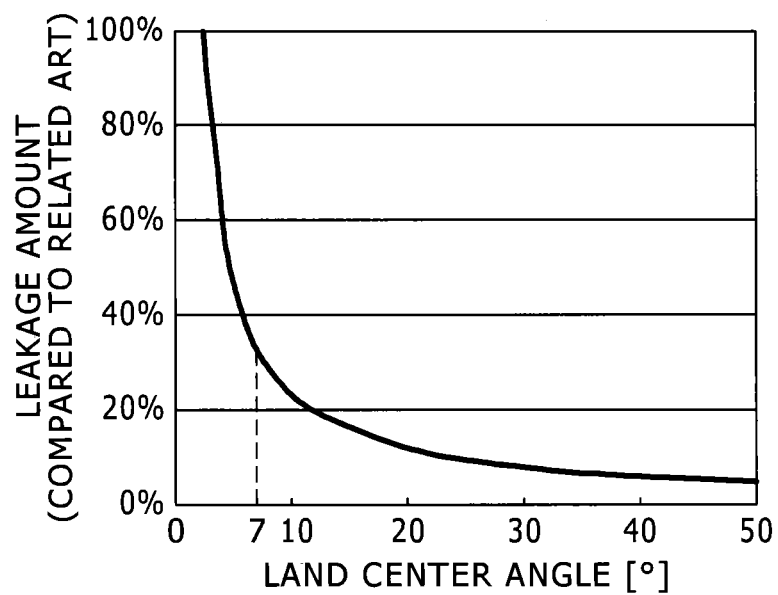
FIG. 5 is a graph illustrating a relation between a land center angle and a leakage amount of a material to be mixed with respect to the rear surface of the blade.

The leakage amount of the material to be mixed to the blade rear surface is calculated by changing the land center angle. The calculation result is illustrated in FIG. 5. In the graph of FIG. 5, the vertical axis indicates the leakage amount (%), and this leakage amount is represented by percentage with the leakage amount in a case of the land center angle of 2° of the related art assumed as 100%. As understood from FIG. 5, if the land center angle is equal to or larger than 7°, the leakage amount can be suppressed to about ⅓ or less of the leakage amount of the related art. On the other hand, it is understood from FIG. 5 that, even if the land center angle is larger than 40°, the further improvement in the effect of suppressing the leakage amount can be hardly expected.

(Test Result 1)

The internal mixer including the mixing rotors according to each of the embodiments and the internal mixer including the mixing rotors according to a comparative example were operated in the same conditions and a test of investigating a difference in performance was performed. In this test, materials to be mixed each having a high content of silica were used. Specifically, the test was performed on each of a plurality of types of materials to be mixed containing silica with different values of PHR from 70 to 90. Note that the PHR (Parts per hundred rubber) indicates weight parts of various combination agents with rubber weight is assumed as 100. Table 1 below shows combination contents of the material to be mixed containing silica that was combined so as to have a PHR of 80 among the plurality of types of materials to be mixed.

TABLE 1

| Item | PHR |
|---|---|
| OIL EXTENDED SBR (SOLUTION POLYMERIZATION STYRENE BUTADIENE RUBBER) | 96 |
| BR (BUTADIENE RUBBER) | 30 |
| SILICA | 80 |
| ZINC OXIDE | 3 |
| STEARIC ACID | 2 |
| WAX | 1 |
| ANTIOXIDANT | 1.5 |
| COUPLING AGENT | 6.4 |
| ALTERNATIVE AROMA OIL | 15 |

*) The above-described combination is a model combination having a high content of silica.

As the mixing rotor according to the comparative example and the internal mixer according to the comparative example, the mixing rotor (4) including one non-linear blade and three linear blades as mixing blades as disclosed in JP 2002-11336 A and the batch mixer (1) (internal mixer) including the mixing rotor (4) were used, respectively. Furthermore, the mixing operation using the internal mixer according to the embodiments and the mixing operation using the internal mixer according to the comparative example were performed in the same conditions (configurations) except for the configuration of the mixing blades. The size of the mixing rotors (the internal mixer) was also the same among the embodiments and the comparative example. The inner diameter of the chamber was also the same among the embodiments and the comparative example.

Figure 6:
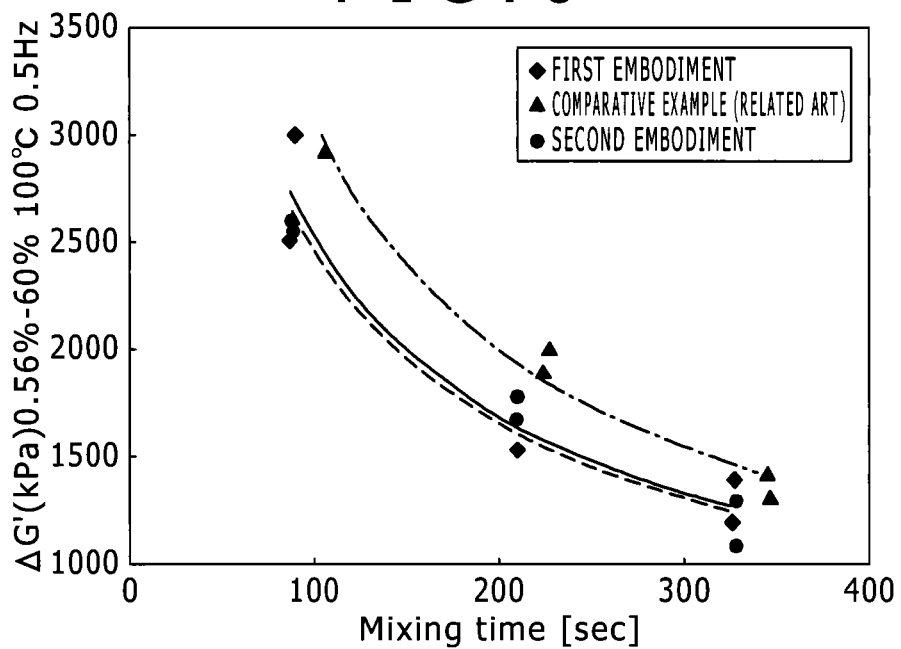
FIG. 6 is a graph illustrating a relation between a value $\Delta G'$ and a mixing time.

FIG. 6 illustrates a test result. In FIG. 6, a solid line illustrates the test result in a case of using the mixing rotors according to the first embodiment, a dashed line indicates the test result in a case of using the mixing rotors according to the second embodiment, and a one-dotted chain line indicates the test result in a case of using the mixing rotors according to the comparative example. In FIG. 6, a vertical axis of the graph indicates a value $\Delta G'$, and a horizontal axis of the graph indicates the mixing time.

The value $\Delta G'$ indicates a difference between a storage elastic modulus in a small deformation/distortion state obtained from viscoelastic properties of unvulcanized rubber composition and a storage elastic modulus in a large deformation/distortion state obtained from the same viscoelastic properties, and serves as an index (herein, index for evaluating the dispersion of silica in the mixed material) for determining the quality of the mixed material. It means that the quality of the mixed material is higher if the value $\Delta G'$ is smaller.

Further, the result illustrated in FIG. 6 was obtained by measuring the strain dependence of the storage elastic moduli G' of the mixed material from the small deformation/distortion state in which the storage elastic modulus was 0.56% to the large deformation/distortion state in which the storage elastic modulus was 60% by an RPA (Rubber Processing Analyzer) 2000 manufactured by Alpha Technologies Co. in the conditions in which the temperature of the mixed material during the measurement of the value $\Delta G'$ was 100° C. and the frequency of causing the strain of the mixed material was 0.5 Hz.

As understood from FIG. 6, if the mixing rotors according to the first and second embodiments were used, the quality of the mixed material largely improved as compared to the case of using the mixing rotors according to the related art.

(Test Result 2)

A silane coupling agent is mixed in the material to be mixed in which silica is combined so as to couple silica with rubber. In the operation of mixing the material to be mixed, the silane coupling agent reacts with the silica, for example, when the temperature of the material to be mixed is in a range from 140° C. to 160° C. Accordingly, in order to satisfactorily cause the reaction, there is a need to sufficiently mix the material to be mixed so that the silica and the silane coupling agent are uniformly mixed with each other while the temperature of the material to be mixed is maintained in the range from 140° C. to 160° C. Therefore, the following mixing test was performed in order to evaluate the uniformity in the operation of mixing the material to be mixed.

In this mixing test, a change in a value CV of a predetermined element contained in the material to be mixed was investigated in each of a case of mixing the material to be mixed by assembling three-dimensional scale models of the mixing rotors according to the first embodiment, the mixing rotors according to the second embodiment, and the mixing rotors according to the comparative example into a test device in which inner diameters of left and right portions of a chamber accommodating therein paired mixing rotors were equal to each other. In the mixing test, a simulant material prepared by adding 0.4% of glass beads to 30% of a solution of CMC (carboxymethyl cellulose) was used as the material to be mixed. The glass beads in the simulant material corresponded to the predetermined element. Furthermore, even in the mixing test, all conditions are the same among the first embodiment, the second embodiment, and the comparative example except that the mixing blades differ in configuration.

Figure 7:
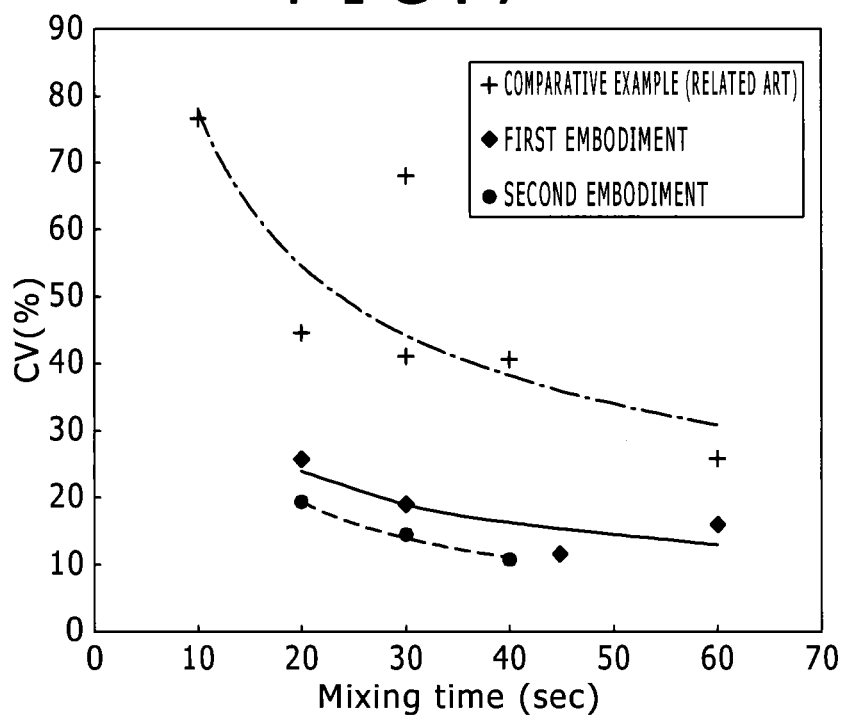
FIG. 7 is a graph illustrating a relation between a value CV and a mixing time.

FIG. 7 illustrates the result of the three-dimensional test (mixing test). In FIG. 7, a solid line indicates the test result in the case of using the mixing rotors according to the first embodiment, a dotted line indicates the test result in the case of using the mixing rotors according to the second embodiment, and a one-dotted chain line indicates the test result in the case of using the mixing rotors according to the comparative example. In FIG. 7, a vertical axis of the graph indicates the value CV, and a horizontal axis of the graph indicates the mixing time.

The value CV indicates a value that corresponds to an evaluation index indicating the uniformity of the element, that is, a dispersion degree of the element in the material to be mixed. It means that the dispersion of the element in the material to be mixed continues if the value CV decreases. In other words, it means that the mixing of the material to be mixed is promoted and the quality of the mixed material is good. The value CV may be obtained by the following Equation (1).

$$CV = \rho / M \qquad (1)$$

In Equation (1), M indicates an average fraction of the predetermined element (glass beads) in the material to be mixed accommodated in the chamber. The average fraction M may be obtained as below. A predetermined amount of the material to be mixed is sampled from each of nine positions of one batch material to be mixed that is mixed inside the chamber, the number of the beads included in the material to be mixed at each sampling position is measured, a fraction of the beads in the material to be mixed at each sampling position is calculated on the basis of the number of measured beads, and the average fraction of the beads in the material to be mixed at each sampling position is calculated from the fraction of the beads in the material to be mixed at each sampling position. Further, in Equation (1), ρ indicates the standard deviation of the fraction of the predetermined element (glass beads) in the material to be mixed accommodated inside the chamber.

From the result of FIGS. 6 and 7, it is understood that any one of the dispersibility and uniformity of the mixed material is improved as compared to the case of using the mixing rotors according to the comparative example (related art) when the mixing rotors of the first and second embodiments are used. Further, comparison of the mixing time of each case shows that, if the mixing rotors according to the first and second embodiment were used, the mixed material having the same dispersibility or uniformity could be obtained in a short time as compared to the case of using the mixing rotors according to the comparative example (related art). That is, it is understood that the productivity also improved if the mixing rotors according to the first and second embodiments were used.

(Land Center Angle and Biting Angle)

Figure 8:
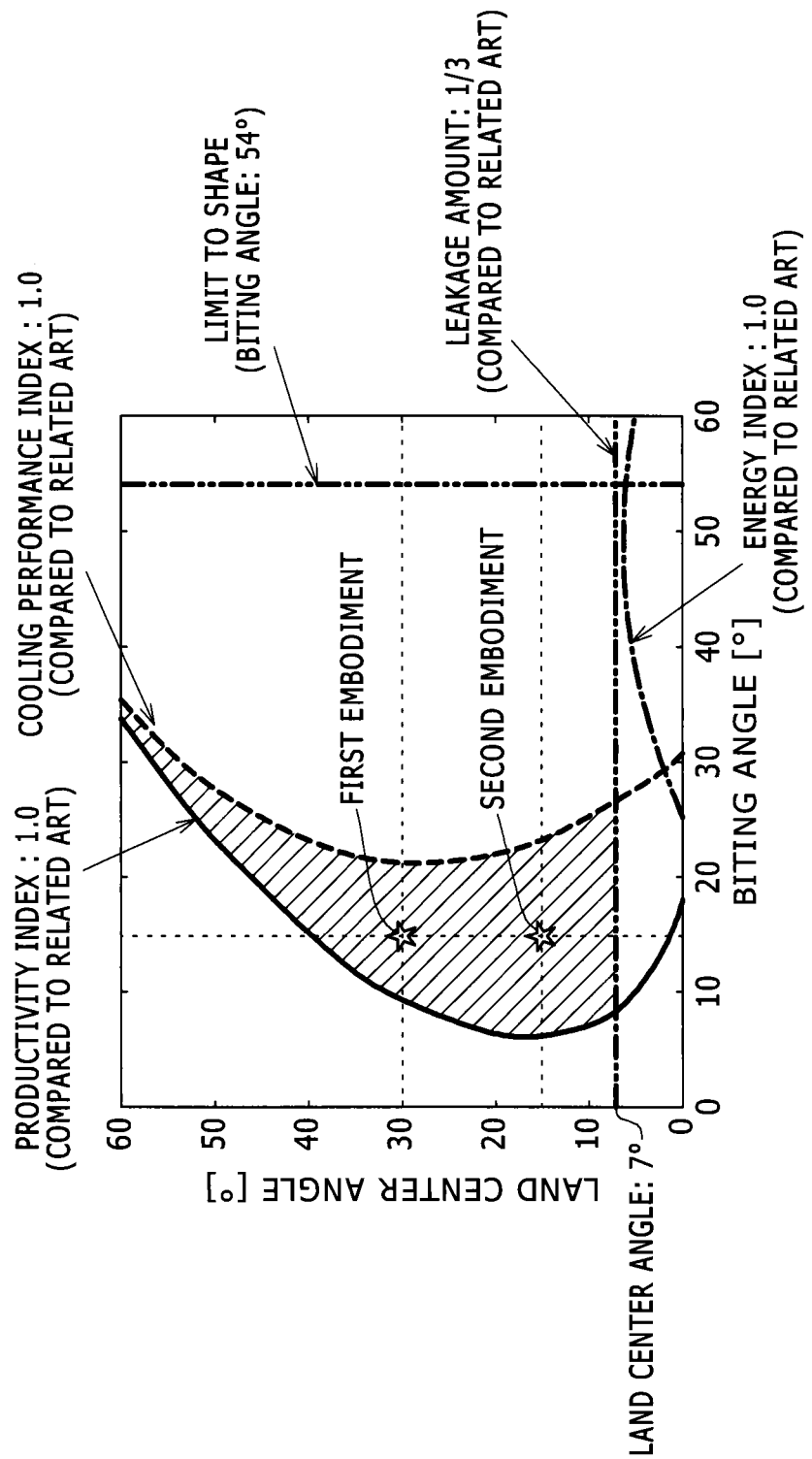
FIG. 8 is a diagram summarizing the shapes of the mixing rotors capable of transmitting high specific energy to the material to be mixed while preventing an excessive increase in the temperature of the material to be mixed and of obtaining higher productivity with respect to two parameters of a land center angle and a biting angle in comparison to the related art.

FIG. 8 is a diagram summarizing the shapes of the mixing rotors capable of transmitting high specific energy to the material to be mixed while preventing an excessive increase in the temperature of the material to be mixed and of obtaining higher productivity with respect to two parameters of the land center angle and the biting angle in comparison to the related art.

In this case, if a productivity index P as an index indicating the productivity of the internal mixer using the mixing rotors for the mixed material is obtained according to the following Equation (2) and the values of the biting angle and the land center angle of each blade are determined so that the productivity index P is set to be larger than "1", the productivity of the internal mixer for the mixed material improves as compared to the related art. Further, if an energy index E as an index indicating the magnitude of the specific energy transmitted to the material to be mixed by the mixing rotors when the material to be mixed is mixed by the mixing rotors according to the following Equation (3) and the values of the biting angle and the land center angle of each blade are determined so that the energy index E is set to be larger than "1", the specific energy higher than that of the related art can be transmitted to the material to be mixed. Furthermore, if a cooling performance index C as an index indicating a cooling performance for the material to be mixed when the material to be mixed is mixed by the mixing rotors according to the following Equation (4) and the values of the biting angle and the land center angle of each blade are determined so that the cooling performance index C is set to be smaller than "1", the effect of preventing the excessive increase in the temperature of the material to be mixed can improve as compared to the related art.

$$P = 0.9227 + 0.006x + 0.0042y - 0.0001x^2 + 0.0002xy - 0.0002y^2 \quad (2)$$

$$E = 1.6453 - 0.0342x + 0.033y + 0.0003x^2 - 7.8444 \times 10^{-18}xy - 3.1099 \times 10^{-5}y^2 \quad (3)$$

$$C = 0.6304 + 0.0108x + 0.0092y + 3.6995 \times 10^{-5}x^2 - 2.8554 \times 10^{-5}xy - 0.0002y^2 \quad (4)$$

In Equations (2) to (4), x indicates the biting angle (°) of the blade, and y indicates the land center angle (°) of the blade.

A solid line of FIG. 8 indicates a line that passes through points indicating the biting angle and the land center angle of the blade in a case where the productivity index P obtained according to Equation (2) is "1". Further, a one-dotted chain line of FIG. 8 indicates a line that passes through points indicating the biting angle and the land center angle of the blade when the energy index E obtained according to Equation (3) is "1". A dashed line of FIG. 8 indicates a line that passes through points indicating the biting angle and the land center angle of the blade when the cooling performance index C obtained according to Equation (4) is "1".

Note that the related art as the comparison target corresponds to the mixing rotor (4) and the batch mixer (1) using the mixing rotor (4) disclosed in JP 2002-11336 A.

Since the biting angle and the land center angle of each blade are set so that the productivity index P, the energy index E, and the cooling performance index C obtained by Equations (2), (3), and (4) satisfy the above-described conditions (P>1, E>1, and C<1), it is possible to simply obtain the shape of the mixing rotor capable of transmitting higher specific energy to the material to be mixed while preventing the excessive increase in the temperature of the material to be mixed and of obtaining higher productivity as compared to the mixing rotor (4) of the related art disclosed in JP 2002-11336 A when the other conditions that may not be desirably changed are set to be equal. Furthermore, a hatched area in FIG. 8 indicates an area in which the productivity index P, the energy index E, and the cooling performance index C all satisfy the above-described conditions (P>1, E>1, and C<1), and in which the leakage amount of the material to be mixed is ⅓ or less of the leakage amount of the related art.

While the embodiments of the present invention have been described, the present invention is not limited to the above-described embodiments, and various modifications may be made within the scope of claims.

For example, while the development shapes, the land widths, the torsion angles, the lengths, the biting angles, and the land center angles of the first long blade and the second long blade are substantially equal to each other in the above-described embodiments, the present invention is not limited thereto. Moreover, while the land widths, the biting angles, and the land center angles of the long blades and the short blades are equal to one another in the above-described embodiments, the present invention is not limited thereto.

Furthermore, while the mixing blades of the paired mixing rotors according to the above-described embodiments are substantially formed into the same shape, the mixing blades of the paired mixing rotors may have substantially different shapes. Moreover, the mixing blades according to the above-described embodiments are formed so that the development shapes of the mixing blades are linear when the mixing blade portion is developed in a plane shape about the axial center. However, the development shapes of the mixing blades (long blades and/or the short blades) according to the present invention may be non-linear.

Outline of Embodiments

The above-described embodiments may be summarized as below.

The mixing rotor according to the embodiments is a mixing rotor for use in an internal mixer, the mixing rotor including: a rotor shaft portion that includes a cooling passageway formed therein; and a mixing blade portion that is formed in the outer circumferential portion of the rotor shaft portion, wherein the mixing blade portion includes a short blade at a predetermined length in the axis direction of the rotor shaft portion, and at least two long blades at lengths larger than the length of the short blade in the axis direction, each of the long blades including a land portion as an end surface of the long blade facing the radially outside of the mixing rotor, the length of each of the long blades in the axis direction is set to be 0.6 times or more as large as the length of the mixing blade portion in the axis direction, a biting angle of each of the long blades is set to an angle equal to or smaller than 31°, and a center angle with respect to a land width as a width of the land portion in the cross-section of each of the long blades orthogonal to the axis direction is set to an angle equal to or larger than 7°.

In the mixing rotor, each of the long blades may include an action surface that corresponds to a surface of the long blade facing the front side of the mixing rotor in the rotation direction of the long blade, and a boundary portion that is formed by the land portion and the action surface. Preferably, the land portion may depict a circular trajectory during rotation of the mixing rotor in the cross-section of each of the long blades orthogonal to the axis direction, and the biting angle of each of the long blades may be an angle between a tangential line of the circular trajectory in the boundary portion and the tangential line of the action surface in the boundary portion in the cross-section of each of the long blades orthogonal to the axis direction.

In the mixing rotor, it is preferable that the center angle with respect to the land width of each of the long blades may be set to an angle equal to or smaller than 40°.

In the mixing rotor, it is preferable that the biting angle of each of the long blades may be set to an angle equal to or larger than 10° and equal to or smaller than 21°.

In the mixing rotor, it is preferable that a torsion angle of each of the long blades is equal to or larger than 40° with respect to an axial line of the rotor shaft portion. In this case, it is more preferable that the torsion angle of each of the long blades may be set to an angle equal to or larger than 50° and equal to or smaller than 65°.

In the mixing rotor, it is preferable that if a productivity index as an index indicating productivity of the internal mixer for producing a mixed material by using the mixing rotor is denoted by P, an energy index as an index indicating a magnitude of energy transmitted to a material to be mixed by the mixing rotor when the material to be mixed is mixed by the mixing rotor is denoted by E, the biting angle is denoted by x, and the center angle with respect to the land width is denoted by y, the biting angle x and the center angle y may be set so as to satisfy a condition that the productivity index P obtained by the following Equation (1) and the energy index E obtained by the following Equation (2) both become values larger than 1.

$$P = 0.9227 + 0.006x + 0.0042y - 0.0001x^2 + 0.0002xy - 0.0002y^2 \quad \text{Equation (1)}$$

$$E = 1.6453 - 0.0342x + 0.033y + 0.0003x^2 - 7.8444 \times 10^{-18}xy - 3.1099 \times 10^{-5}y^2 \quad \text{Equation (2)}$$

In this case, it is preferable that if a cooling performance index as an index indicating a cooling performance for the material to be mixed when the material to be mixed is mixed by the mixing rotor is denoted by C, the biting angle x and the center angle y may be set so as to satisfy a condition that the cooling performance index C obtained by the following Equation (3) becomes a value larger than 1.

$$C = 0.6304 + 0.0108x + 0.0092y + 3.6995 \times 10^{-5}x^2 - 2.8554 \times 10^{-5}xy - 0.0002y^2 \quad \text{Equation (3)}$$

The internal mixer according to the embodiments includes: the paired the mixing rotors; and a chamber that accommodates the paired mixing rotors therein while trajectories depicted by radially outermost portions of the mixing rotors do not intersect each other during rotation of the paired mixing rotors.

In the internal mixer, it is preferable that a gap may be formed between the land portion of each of the long blades of each of the mixing rotors and an inner wall surface of a portion accommodating the mixing rotors in the chamber, and that a size of the gap with respect to each of the mixing rotors may be set so as to have a ratio equal to or larger than 0.005 and equal to or smaller than 0.05 to an inner diameter of the portion accommodating the mixing rotors in the chamber.

The invention claimed is:

1. A mixing rotor for use in an internal mixer, the mixing rotor comprising:
   a rotor shaft portion that includes a cooling passageway formed therein; and
   a mixing blade portion that is formed in an outer circumferential portion of the rotor shaft portion,
   wherein the mixing blade portion includes a short blade at a predetermined length in an axis direction of the rotor shaft portion, and at least two long blades at lengths larger than the length of the short blade in the axis direction, each of the long blades including a land portion as an end surface of the long blade facing a radially outside of the mixing rotor,
   wherein the length of each of the long blades in the axis direction is set to be 0.6 times or more as large as a length of the mixing blade portion in the axis direction,
   wherein a biting angle of each of the long blades is set to an angle equal to or smaller than 31°, and
   wherein a center angle with respect to a land width as a width of the land portion in a cross-section of each of the long blades orthogonal to the axis direction is set to an angle equal to or larger than 7°.

2. The mixing rotor according to claim 1,
   wherein each of the long blades includes an action surface that corresponds to a surface of the long blade facing a front side of the mixing rotor in a rotation direction of the mixing rotor, and a boundary portion that is formed by the land portion and the action surface, and
   wherein the land portion depicts a circular trajectory during rotation of the mixing rotor in the cross-section of each of the long blades orthogonal to the axis direction, and the biting angle of each of the long blades is an angle between a tangential line of the circular trajectory in the boundary portion and a tangential line of the action surface in the boundary portion in the cross-section of each of the long blades orthogonal to the axis direction.

3. The mixing rotor according to claim 1,
   wherein the center angle with respect to the land width of each of the long blades is set to an angle equal to or smaller than 40°.

4. The mixing rotor according to claim 1,
   wherein the biting angle of each of the long blades is set to an angle equal to or larger than 10° and equal to or smaller than 21°.

5. The mixing rotor according to claim 1,
   wherein a torsion angle of each of the long blades is equal to or larger than 40° with respect to an axial line of the rotor shaft portion.

6. The mixing rotor according to claim 5,
   wherein the torsion angle of each of the long blades is set to an angle equal to or larger than 50° and equal to or smaller than 65°.

7. The mixing rotor according to claim 1,
wherein if a productivity index as an index indicating productivity of the internal mixer for producing a mixed material by using the mixing rotor is denoted by P, an energy index as an index indicating a magnitude of energy transmitted to a material to be mixed by the mixing rotor when the material to be mixed is mixed by the mixing rotor is denoted by E, the biting angle is denoted by x, and the center angle with respect to the land width is denoted by y, the biting angle x and the center angle y are set so as to satisfy a condition that the productivity index P obtained by the following Equation (1) and the energy index E obtained by the following Equation (2) both become values larger than 1:

$$P = 0.9227 + 0.006x + 0.0042y - 0.0001x^2 + 0.0002xy - 0.0002y^2 \quad \text{Equation (1)}$$

$$E = 1.6453 - 0.0342x + 0.033y + 0.0003x^2 - 7.8444 \times 10^{-18}xy - 3.1099 \times 10^{-5}y^2 \quad \text{Equation (2)}.$$

8. The mixing rotor according to claim 7,
wherein if a cooling performance index as an index indicating a cooling performance for the material to be mixed when the material to be mixed is mixed by the mixing rotor is denoted by C, the biting angle x and the center angle y are set so as to satisfy a condition that the cooling performance index C obtained by the following Equation (3) becomes a value smaller than 1:

$$C = 0.6304 + 0.0108x + 0.0092y + 3.6995 \times 10^{-5}x^2 - 2.8554 \times 10^{-5}xy - 0.0002y^2 \quad \text{Equation (3)}.$$

9. An internal mixer comprising:
a pair of mixing rotors according to claim 1; and
a chamber that accommodates the paired mixing rotors therein while trajectories depicted by radially outermost portions of the mixing rotors do not intersect each other during rotation of the paired mixing rotors.

10. The internal mixer according to claim 9,
wherein a gap is formed between the land portion of each of the long blades of each of the mixing rotors and an inner wall surface of a portion accommodating the mixing rotors in the chamber, and
a size of the gap with respect to each of the mixing rotors is set so as to have a ratio equal to or larger than 0.005 and equal to or smaller than 0.05 to an inner diameter of the portion accommodating the mixing rotors in the chamber.

\* \* \* \* \*